(12) United States Patent
Abdelhameed et al.

(10) Patent No.: US 12,301,339 B2
(45) Date of Patent: May 13, 2025

(54) METHOD AND SYSTEM FOR PERFORMING TIME-SYNCHRONIZATION

(71) Applicant: Bayerische Motoren Werke Aktiengesellschaft, Munich (DE)

(72) Inventors: Mohamed-Saad Abdelhameed, Dachau (DE); Manjeet Singh Bilra, Hoerlkofen (DE); Karl Budweiser, Munich (DE); Wolfgang Laengst, Bergkirchen (DE); Markus Schurius, Munich (DE); Nils Unger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 155 days.

(21) Appl. No.: 17/798,955

(22) PCT Filed: Feb. 21, 2020

(86) PCT No.: PCT/EP2020/054607
§ 371 (c)(1),
(2) Date: Aug. 11, 2022

(87) PCT Pub. No.: WO2021/164882
PCT Pub. Date: Aug. 26, 2021

(65) Prior Publication Data
US 2023/0093337 A1    Mar. 23, 2023

(51) Int. Cl.
*H04J 3/06* (2006.01)
*H04L 12/40* (2006.01)
(Continued)

(52) U.S. Cl.
CPC ............ *H04J 3/0667* (2013.01); *H04L 12/40* (2013.01); *H04W 56/001* (2013.01)

(58) Field of Classification Search
CPC ...... H04J 3/0644; H04J 3/0655; H04J 3/0667; H04L 12/40; H04L 67/12; H04L 67/125; H04W 56/001
See application file for complete search history.

(56) References Cited

U.S. PATENT DOCUMENTS 9,335,785 B2 * 5/2016 Mihelič ................. H04J 3/0667
9,912,465 B2 * 3/2018 Mihelic ................. H04J 3/0667
(Continued)

FOREIGN PATENT DOCUMENTS

CN     108168918 A    6/2018
CN     109450582 A    3/2019
(Continued)

OTHER PUBLICATIONS

International Search Report (PCT/ISA/210) issued in PCT Application No. PCT/EP2020/054607 dated Nov. 16, 2020 (three (3) pages).

(Continued)

*Primary Examiner* — Alpus Hsu
(74) *Attorney, Agent, or Firm* — Crowell & Moring LLP

(57) ABSTRACT

A method performs time-synchronization between a master clock and a plurality of slave clocks. The method performs a forward time-synchronization from the master clock to the plurality of slave clocks. Further, the method performs a reverse time-synchronization from the plurality of slave clocks to a corresponding plurality of validator clocks. In addition, the method validates the time-synchronization between the plurality of slave clocks, notably between the master clock and the plurality of slave clocks, based on the plurality of validator clocks.

10 Claims, 2 Drawing Sheets

(51) Int. Cl.
*H04L 12/727* (2013.01)
*H04L 12/751* (2013.01)
*H04W 56/00* (2009.01)

(56) References Cited

U.S. PATENT DOCUMENTS

| | | | | |
|---|---|---|---|---|
| 10,158,441 | B1* | 12/2018 | Butterworth | H04W 56/0015 |
| 2007/0147435 | A1* | 6/2007 | Hamilton | H04L 43/0858 |
| | | | | 370/503 |
| 2013/0301635 | A1 | 11/2013 | Hollabaugh et al. | |
| 2017/0359139 | A1 | 12/2017 | Butterworth et al. | |
| 2018/0088584 | A1 | 3/2018 | Tascione et al. | |
| 2018/0145821 | A1* | 5/2018 | Pietiläinen | H04J 3/0641 |
| 2018/0307635 | A1 | 10/2018 | Rota | |
| 2019/0089716 | A1* | 3/2019 | Stöcker | H04L 67/125 |
| 2019/0121359 | A1* | 4/2019 | Dobberphul | B60W 50/029 |
| 2019/0363815 | A1 | 11/2019 | Bogenberger et al. | |
| 2019/0394017 | A1 | 12/2019 | Seo et al. | |
| 2020/0169345 | A1* | 5/2020 | Andersson | H04J 3/0697 |
| 2020/0322075 | A1* | 10/2020 | Bhandari | H04J 3/0688 |
| 2021/0181787 | A1* | 6/2021 | Chan | G06F 1/10 |
| 2021/0218656 | A1 | 7/2021 | Meier et al. | |
| 2021/0235405 | A1* | 7/2021 | Kaplan | H04L 12/40176 |

FOREIGN PATENT DOCUMENTS

| | | |
|---|---|---|
| CN | 110168971 A | 8/2019 |
| CN | 110650175 A | 1/2020 |
| DE | 10 2018 207 684 A1 | 11/2019 |
| WO | WO 2018/234006 A1 | 12/2018 |

OTHER PUBLICATIONS

Written Opinion (PCT/ISA/237) issued in PCT Application No. PCT/EP2020/054607 dated Nov. 16, 2020 (seven (7) pages).

Chinese-language Office Action issued in Chinese Application No. 202080097208.3 dated Nov. 26, 2024, with English translation (21 pages).

* cited by examiner

METHOD AND SYSTEM FOR PERFORMING TIME-SYNCHRONIZATION

BACKGROUND AND SUMMARY

The present document is directed at performing time-synchronization between different units within a data communication network, notably between different control units of a vehicle.

A vehicle may comprise different environment sensors which are configured to provide sensor data with regards to the environment of the vehicle. A control unit within the vehicle may make use of and/or may fuse the sensor data from the different environment sensors to determine an environment model which indicates the position of objects within the environment of the vehicle. The vehicle may then be operated, e.g. within an autonomous driving mode, based on the environment model.

The different environment sensors typically each comprise a local time clock which is configured to provide a time stamp for the sensor data which is captured by the respective environment sensor. The time stamps of the sensor data which is provided by the different sensors are typically taken into account when fusing the sensor data to determine the environment model.

Differences in the local times which are indicated by the local time clocks of the different environment sensors may lead to inaccuracies of the environment model and may impair autonomous driving. In addition, such sensor data timing and/or time synchronization errors are typically common cause errors, even if redundant sensors or diverse sensor fusion algorithms are used, in case the different local time clocks of the sensors are synchronized over the same communication network (e.g. bus media) which comprises one or more unreliable components (e.g. switches).

The present document is directed at the technical problem of enabling a time-synchronization between different units, notably between different sensors and/or a fusion unit, at a relative high integrity level.

The technical problem is solved by the independent claims. Preferred examples are specified in the dependent claims.

According to an aspect, a method for performing time-synchronization between a master clock and a plurality of slave clocks (e.g. 2 or more, or 3 or more, or 5 or more slave clocks) is described. The plurality of slave clocks may be associated with a plurality of sensors (e.g. environment sensors of a vehicle, notably a car or a truck or a bus). Each of the sensors may be configured to provide sensor data with a time stamp generated by the respective slave clock. The time stamps of the sensor data may be used during fusion of the sensor data, in order to fuse sensor data which relates to the same time instant, thereby increasing the quality of an environment model which is generated based on the fused sensor data.

The method may comprise performing a forward time-synchronization from the master clock to the plurality of slave clocks. In particular, the method may comprise performing a forward time-synchronization from the master clock to a fusion clock of a fusion unit, wherein the fusion unit is configured to perform sensor fusion of the sensor data provided by the plurality of sensors. The forward time-synchronization may then be performed from the master clock to the plurality of slave clocks (of the corresponding plurality of sensors) via the fusion unit.

During forward time-synchronization the slave time of a slave clock may be time-synchronized with the master time of the master clock and/or with the fusion time of the fusion clock. Forward time-synchronization may be performed in an efficient and precise manner using the PTP (Precision Time Protocol) protocol. Forward time-synchronization may be performed over a communication network, notably over an Ethernet network. The communication may exhibit a relatively low integrity level (e.g. ASIL B or QM).

The method further comprises performing a reverse time-synchronization from the plurality of slave clocks to a corresponding plurality of validator clocks. The validator clocks may be part of a validator. The validator may comprise a plurality of time domains for the corresponding plurality of validator clocks. During reverse time-synchronization the slave time of a slave clock may be time-synchronized with the validator time of a corresponding validator clock. Reverse time-synchronization may be performed using the PTP protocol. Furthermore, reverse time-synchronization may be performed over a communication network, notably over an Ethernet network.

The validator comprising the plurality of validator clocks may have a higher integrity level, notably a higher ASIL level, than at least one or more components (notably switches) of the communication network. In particular, the validator may exhibit ASIL D.

In addition, the method comprises validating the time-synchronization between the plurality of slave clocks, notably between the master clock and the plurality of slave clocks, based on the plurality of validator clocks. Validating the plurality of slave clocks may comprise comparing the validator times of the plurality of validator clocks with one another. In particular, the plurality of slave clocks may be validated, if the validator times of the plurality of validator clocks are time-synchronized (e.g. equal to one another). On the other hand, it may be determined that the plurality of slave clocks is not time-synchronized (and by consequence not validated), if the validator times of at least two of the plurality of validator clocks are not time-synchronized.

Hence, an efficient and reliable time-synchronization between different sensors of a vehicle may be enabled. In particular, the integrity of the time stamps of the sensor data of the different sensors of a vehicle may be increased, thereby increasing the integrity of an environment model and/or the integrity of an autonomous driving mode of the vehicle.

The method may further comprise performing a reverse time-synchronization from the fusion clock of the fusion unit to a corresponding validator clock (of the validator). In other words, the validator may also comprise a validator clock for the fusion clock. By doing this, it may be verified whether the fusion clock is time-synchronized with the plurality of slave clocks (of the corresponding plurality of sensors), thereby increasing the quality and/or integrity of sensor fusion.

As indicated above, forward time-synchronization and/or reverse time-synchronization may be performed over an Ethernet network. In this context, forward time-synchronization and reverse time-synchronization may make use of different EtherTypes, thereby allowing for a clear separation between forward time-synchronization and reverse time-synchronization, in order to increase the reliability of time-synchronization.

A message used for reverse time-synchronization may exhibit a higher priority with regards to processing and/or transmission (within the communication network) than a message used for forward time-synchronization. By doing this, the reliability of the validation of time-synchronization may be increased.

The plurality of validator clocks may be implemented in a corresponding plurality of different time domains of a Synchronized Time-Base Manager of the AUTOSAR standard. As a result of this, a particularly efficient and reliable validation of time-synchronization may be performed.

It should be noted that the synchronization method outlined herein may make use of or may conform to time synchronization standard protocols (notably the PTP protocol) without dedicated integrity or safety assurance aspects (neither in the protocol itself nor in its software implementation). Alternatively, or in addition, the synchronization method outlined herein may be performed over an Ethernet communication network, which typically comprises one or more unreliable network elements (e.g. switches), which typically do not comprise dedicated integrity or safety assurance aspects in the specification and/or in the hardware and software implementation of the network elements. Nevertheless, the synchronization method outlined herein enables time synchronization at a relatively high integrity level (e.g. ASIL D).

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

According to another aspect, a system for performing time-synchronization between a master clock and a plurality of slave clocks is described. The system is configured to perform a forward time-synchronization from the master clock to the plurality of slave clocks. Furthermore, the system is configured to perform a reverse time-synchronization from the plurality of slave clocks to a corresponding plurality of validator clocks. In addition, the system is configured to validate the time-synchronization between the plurality of slave clocks, notably between the master clock and the plurality of slave clocks, based on the plurality of validator clocks.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

The invention is explained below in an exemplary manner with reference to the accompanying drawings.

DETAILED DESCRIPTION OF THE DRAWINGS

Figure 1A:
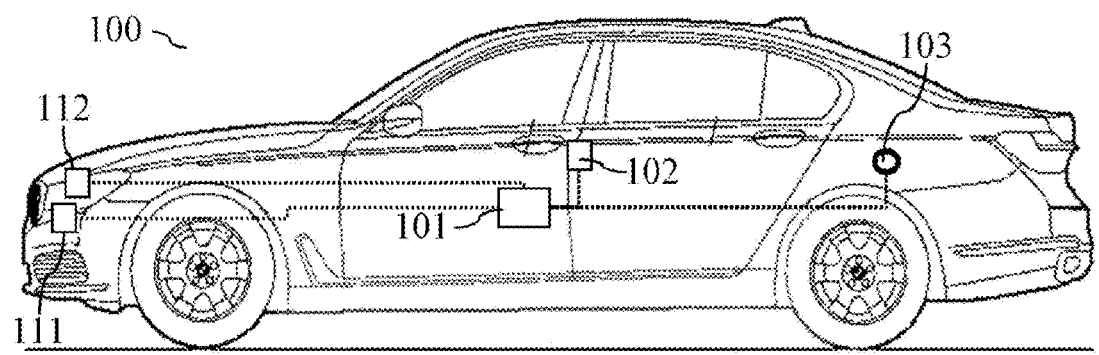
FIG. 1a shows exemplary components of a vehicle.

As indicated above, the present document addresses the technical problem of performing time-synchronization at a high level of integrity, notably at a relatively high ASIL (Automotive Safety Integrity Level) Level, e.g. ASIL D. In this context, FIG. 1a shows example components of a vehicle 100. The vehicle 100 comprises different sensors 111, 112 (notably environment sensors) which are configured to capture sensor data. Example sensors 111, 112 are a radar sensor, a camera, a lidar sensor, an ultrasonic sensor, etc.

A (central) control unit 101 of the vehicle 100 may be configured to perform fusion of the sensor data from the different sensors 111, 112. In particular, the control unit 101 may be configured to determine an environment model of the environment of the vehicle 100 based on the fused sensor data. Furthermore, the control unit 101 may be configured to operate one or more actors 103 (e.g. an engine, a motor, a braking system and/or a steering system) of the vehicle 100 in dependence of the environment model, e.g. in order to provide an autonomous driving mode of the vehicle 100. By way of example, an autonomous longitudinal control and/or lateral control of the vehicle 100 may be performed based on the fused sensor data.

Each sensor 111, 112 of the vehicle 100 typically comprises a local clock which indicates a local time at the respective sensor 111, 112. The sensor data of the different sensors 111, 112 may be provided with time stamps of the respective local clocks. The quality and/or reliability of the fused sensor data and/or of the environment model typically depends on the time synchronicity of the different local clocks. In particular, time offsets between the different local clocks of the different sensors 111, 112 typically leads to a reduced quality of the fused sensor data. This is illustrated in FIGS. 1b and 1c, which show a vehicle 100 and a static object 120, wherein the object 120 is located at a distance 121 from the vehicle 100.

Figure 1B:
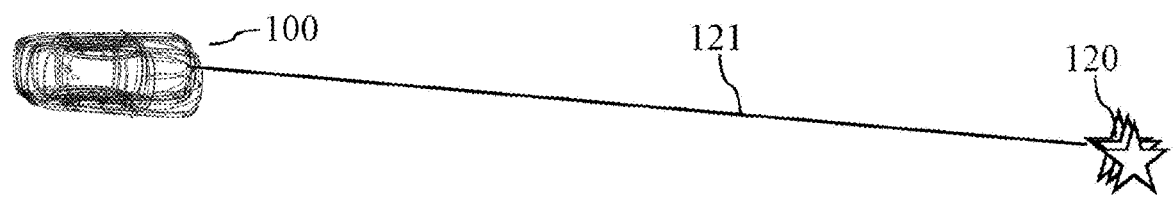
FIG. 1b illustrates the fusion of sensor data in case of time-synchronized environment sensors.
Figure 1C:
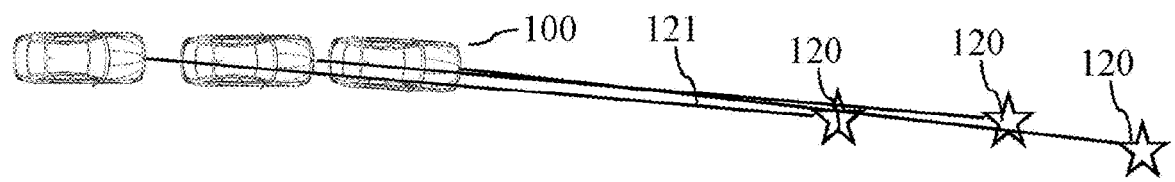
FIG. 1c illustrates the fusion of sensor data in case of environment sensors having time offsets.

FIG. 1b shows a situation, for which the different local clocks are time-synchronized. As a result of this, the position of the vehicle 100 and/or the position of a static object 120, which are indicated by the sensor data of different sensors 111, 112, are similar for all of the different sensors 111, 112. On the other hand, if the local clocks of the different sensors 111, 112 exhibit time offsets with respect to one another, the sensor data of the different sensors 111, 112 may indicate different positions for the vehicle 100 and/or different positions for the static object 120 (see FIG. 1c).

Figure 2A:
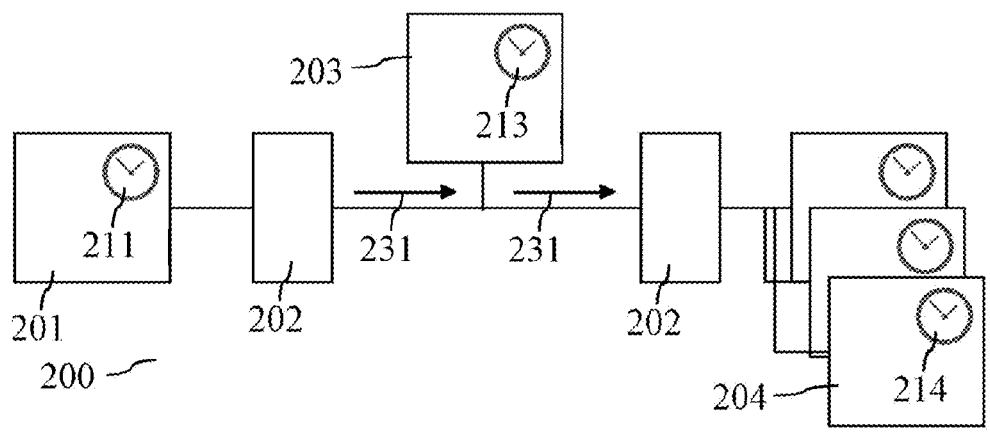
FIG. 2a shows an example of a time-synchronization system.

FIG. 2a shows an example system 200 for synchronizing the local time or the local clocks 213, 214 of different units 203, 204 within a vehicle 100. The system 200 may comprise a plurality of sensor units 204 for a corresponding plurality of sensors 111, 112 of the vehicle 100. Each sensor unit 204 may comprise a local clock 214 which is configured to indicate a local time. Furthermore, the system 200 may comprise a fusion unit 203 which is configured to fuse and/or combine the sensor data provided by the plurality of sensor units 204 (i.e. sensors 111, 112). The fusion unit 203 may comprise a local clock 213 which is configured to indicate a local time.

The different units 203, 204 may be interconnected through a communication network, notably an Ethernet network, comprising one or more switches 202. Furthermore, the synchronization system 200 comprises a master unit 201 comprising a master clock 211 which is configured to indicate a local time at the master unit 201 (also referred to herein as the master time).

The master unit 201 may be configured to perform time-synchronization with the fusion unit 203 and with the plurality of sensor units 204. For this purpose, the PTP (Precision Time Protocol) protocol may be used (specified in IEEE 1588). Due to the fact that at least some of the components within the communication network typically exhibit a relatively low integrity level (notably a relatively low ASIL Level or only QM (Quality Management)), the integrity of time-synchronization is relatively low. As a result of this, the time stamps of the sensor data of the different sensors 111, 112 exhibit a relatively low integrity level.

The distribution of the master time from the master clock 211 to the slave entities 203, 204 or slave clocks 213, 214 may be viewed as a forward time-synchronization 231. As indicated above, the PTP protocol may be used for this forward time-synchronization 231.

Figure 2B:
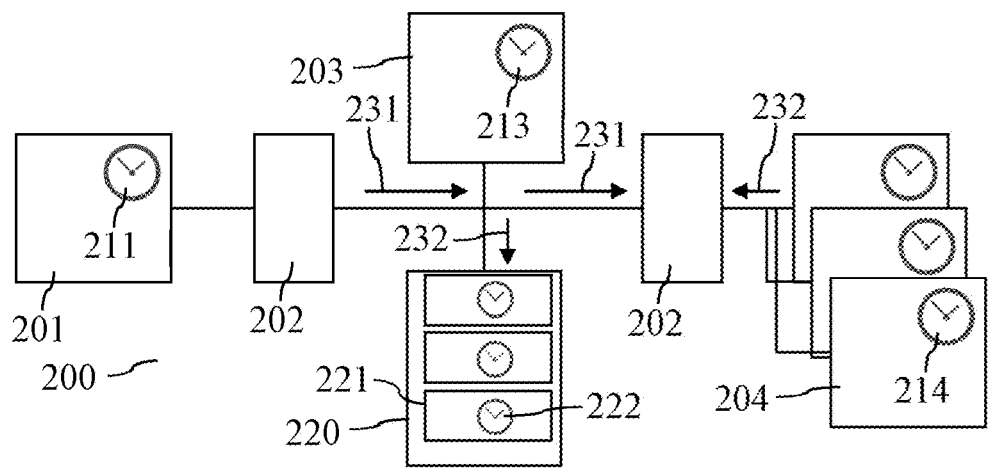
FIG. 2b shows an example of a time-synchronization system with a clock validator.

The system 200 may comprise a validator 220, as illustrated in FIG. 2b. The validator 220 may comprise a plurality of time domains 221 with a respective plurality of validator clocks 222. The validator 220 may exhibit a relatively high integrity level (e.g. ASIL D). The system 200 may be configured to perform backward or reverse time-synchronization 232, during which each of the slave clocks 213, 214 and the master clock 211 are time-synchronized with a respective one of the validator clocks 222. The backward or reverse time-synchronization 232 may be performed using the PTP protocol.

As a result of the backward time-synchronization 232, the validator 220 has access to each slave clock 213, 214 within the system 200 and/or to the master clock 211. In particular, the validator 220 comprises a plurality of validator clocks 222 which are time-synchronized with the corresponding plurality of slave clocks 213, 214. Furthermore, the validator 220 may comprise a validator clock 222 which is time-synchronized with the master clock 211.

The validator 220 may be configured to compare the different times or time stamps which are indicated by the different validator clocks 222. In particular, the validator 220 may be configured to verify whether the different times which are indicated by the different validator clocks 222 are synchronized or not. If the different times a synchronized, then it may be concluded with a relatively high integrity level (e.g. with ASIL D) that the slave clocks 213, 214 of the system 200 are time-synchronized with each other and/or with the master clock 211. As a result of this, it may be ensured at a relatively high integrity level that the time stamps of the sensor data of the different sensors 111, 112 are time-synchronized.

The validator 220 may be implemented in an efficient manner as a Synchronized Time-Base Manager of the AUTOSAR standard. In particular, the multiple time domains 221 of a Synchronized Time-Base Manager may be used for providing the different validator clocks 222.

The validator 220 may form a joint unit with the fusion unit 203. As a result of this, no backward or reverse synchronization 232 needs to be performed with the master clock 211.

Hence, a forward synchronization and a reverse synchronization between the master clock 211 and the slave clocks 213, 214 may be performed according to the PTP Protocol and according to the AUTOSAR standard (using multiple time domains 221). The time stamps which are generated by the different time domains 221 may be monitored for time corruption and clock synchronization. Furthermore, jitter detection according to the Safety Integrity Level ASIL D may be performed by the validator 220. The time monitoring unit (i.e. the validator 220) may be implemented in a single node or in multiple overlapped distributed nodes.

For the forward and the reverse synchronization, the PTP Protocol may make use of different EtherTypes for the forward TSync messages and for the reverse TSync messages. By doing this, correct time-synchronization may be ensured within the Ethernet switches 202, as the Ethernet switches will only perform time stamping for forward TSync messages (as specified within the PTP Protocol).

Figure 3:
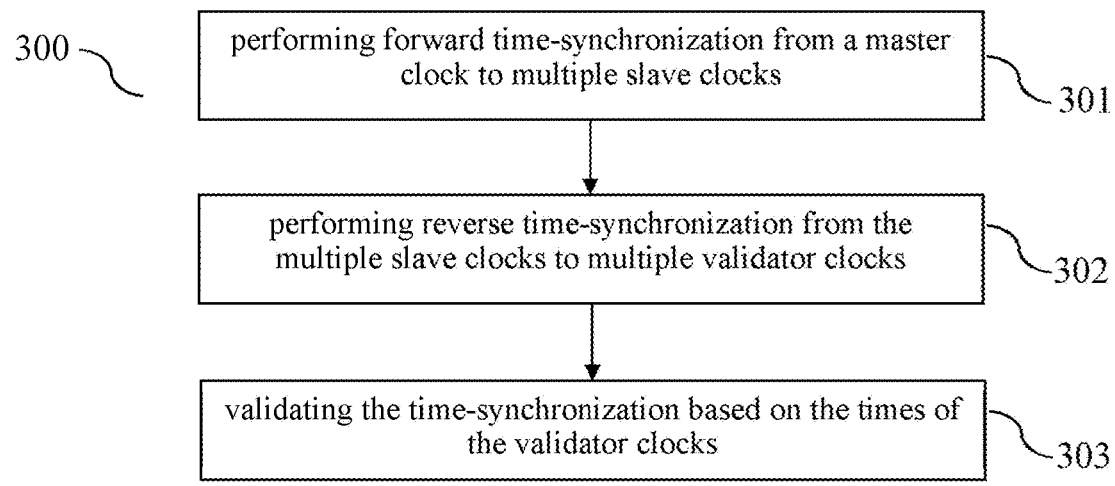
FIG. 3 is a flow chart of an exemplary method for performing time-synchronization.

FIG. 3 shows a flow chart of an example method 300 for performing time-synchronization between a master clock 211 (of a master unit 201) and a plurality of slave clocks 214 (of a corresponding plurality of slave units 204). The plurality of slave clocks 214 may be associated with a corresponding plurality of sensors 111, 112.

The method 300 comprises performing 301 a forward time-synchronization 231 from the master clock 211 to the plurality of slave clocks 214. The forward time-synchronization 231 may be performed via a communication network (notably via an Ethernet network). The communication network may exhibit (at least partially) a relatively low integrity level (e.g. QM), which may lead to a situation where at least one of the slave clock 214 is not time-synchronized with the master clock 211.

The method 300 further comprises performing 302 a reverse time-synchronization 232 from the plurality of slave clocks 214 to a corresponding plurality of validator clocks 222 (e.g. via the communication network). The validator clocks 222 may be part of a validator 220, wherein the validator 220 may exhibit a relatively high integrity level (e.g. ASIL D).

In addition, the method 300 comprises validating 303 the time-synchronization between the plurality of slave clocks 214, notably between the master clock 211 and the plurality of slave clocks 214, based on the plurality of validator clocks 222. For this purpose, the validator times provided by the different validator clocks 222 may be compared. If the validator times are equal and/or time-synchronized, then it may be concluded with a relatively high integrity level (e.g. ASIL D) that the plurality of slave clocks 214 is time-synchronized.

The synchronization scheme described herein may ensure time synchronization with Safety Integrity Level ASIL D, regardless of the Safety Integrity Level of the Ethernet switches 202 within the communication network. Furthermore, the synchronization scheme described herein may ensure time synchronization with Safety Integrity Level ASIL D, regardless of the Safety Integrity Level of the master clock 211.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof

The invention claimed is:

1. A method for performing time-synchronization between a master clock and a plurality of slave clocks, the method comprising:
performing a forward time-synchronization to time-synchronize respective slave clock times of the plurality of slave clocks to a master clock time of the master clock;
performing a reverse time-synchronization to time-synchronize, for each of a plurality of validator clocks, a validator clock time to the slave clock time of a corresponding slave clock of the plurality of slave clocks; and
validating a time-synchronization between the plurality of slave clocks by comparing the validator times of the plurality of validator clocks.

2. The method according to claim 1, wherein forward time-synchronization is performed using precision-time-protocol, and/or reverse time-synchronization is performed using precision-time-protocol.

3. The method according to claim 1, wherein
forward time-synchronization and/or reverse time-synchronization are performed over an Ethernet communication network, and
forward time-synchronization and reverse time-synchronization make use of different EtherTypes.

4. The method according to claim 1, wherein a message used for reverse time-synchronization has a higher priority with regard to processing and/or transmission than a message used for forward time-synchronization.

5. The method according to claim 1, wherein
forward time-synchronization and/or reverse time-synchronization are performed over a communication network, and
a validator comprising the plurality of validator clocks has a higher integrity level than at least one or more components of the communication network.

6. The method according to claim 5, wherein the higher integrity level is a higher automotive-safety-integrity-level.

7. The method according claim 1, wherein the plurality of validator clocks are implemented in a corresponding plurality of different time domains of a Synchronized Time-Base Manager of an automotive-open-system-architecture standard.

8. The method according to claim 1, wherein validating the time-synchronization between the plurality of slave clocks comprises:
comparing the validator times of the plurality of validator clocks;
determining that the plurality of slave clocks are time-synchronized when the validator times of the plurality of validator clocks are operatively equal; and/or
determining that the plurality of slave clocks are not time-synchronized when the validator times of at least two of the plurality of validator clocks are not operatively equal.

9. The method according to claim 1, wherein
the plurality of slave clocks are associated with a plurality of sensors, and
each of the plurality of sensors is configured to provide sensor data with a time stamp generated by the associated slave clock.

10. The method according to claim 9, further comprising:
performing a forward time-synchronization to time-synchronize a fusion time of a fusion clock to the master time of the master clock, wherein the fusion clock is part of a fusion unit configured to perform sensor fusion of the sensor data provided by the plurality of sensors, and wherein the forward time-synchronization of the slave clocks is performed via the fusion unit; and
performing a reverse time-synchronization to time-synchronize the validator time of a corresponding validator clock to the fusion time of the fusion clock.

* * * * *